United States Patent
Kim et al.

(10) Patent No.: US 9,210,695 B2
(45) Date of Patent: Dec. 8, 2015

(54) METHOD AND APPARATUS FOR TRANSMITTING UPLINK CONTROL INFORMATION IN A CARRIER AGGREGATION SYSTEM

(75) Inventors: Min Gyu Kim, Anyang-si (KR); Dong Youn Seo, Anyang-si (KR); Joon Kui Ahn, Anyang-si (KR); Suck Chel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 13/642,479

(22) PCT Filed: Apr. 22, 2011

(86) PCT No.: PCT/KR2011/002957
§ 371 (c)(1),
(2), (4) Date: Oct. 19, 2012

(87) PCT Pub. No.: WO2011/132993
PCT Pub. Date: Oct. 27, 2011

(65) Prior Publication Data
US 2013/0039321 A1 Feb. 14, 2013

Related U.S. Application Data

(60) Provisional application No. 61/327,082, filed on Apr. 22, 2010, provisional application No. 61/359,837, filed on Jun. 30, 2010.

(51) Int. Cl.
*H04W 72/10* (2009.01)
*H04W 72/04* (2009.01)
*H04L 1/00* (2006.01)
*H04L 5/00* (2006.01)

(52) U.S. Cl.
CPC ......... *H04W 72/0413* (2013.01); *H04L 1/0027* (2013.01); *H04L 5/00* (2013.01); *H04L 5/0042* (2013.01); *H04L 5/001* (2013.01); *H04W 72/0446* (2013.01)

(58) Field of Classification Search
CPC . H04W 72/00; H04W 72/04; H04W 72/0406; H04W 72/0413; H04W 72/044; H04W 72/0446
See application file for complete search history.

(56) References Cited

U.S. PATENT DOCUMENTS

2009/0129330 A1 5/2009 Kim et al.
2010/0098012 A1* 4/2010 Bala et al. ............... 370/329
(Continued)

FOREIGN PATENT DOCUMENTS

KR 10-2007-0107577 A 11/2007
KR 10-2009-0086031 A 8/2009

OTHER PUBLICATIONS

Samsung, "Clarification on L1 UCI on UL PCC", 3GPP TSG RAN WG2#69bis, R2-102301, Apr. 12-16, 2010.
(Continued)

*Primary Examiner* — Michael Thier
*Assistant Examiner* — Feben M Haile
(74) *Attorney, Agent, or Firm* — Birch, Stewart, Kolasch & Birch, LLP

(57) ABSTRACT

The present invention provides a method and apparatus for transmitting UCI (uplink control information) by user equipment in a carrier aggregation system. According to the method, the user equipment transmits UCI through a PUSCH (physical uplink shared channel) of a primary cell in a subframe that has PUSCH transmission of the primary cell; and if the subframe that does not have the PUSCH transmission of the primary cell has PUSCH transmission of at least one secondary cell, the user equipment transmits the UCI through the PUSCH of one of the at least one secondary cell. In this case, more than one serving cell is set up in the user equipment; simultaneous transmission of PUSCH and PUCCH (physical uplink control channel), with PUSCH being a data channel and PUCCH being a control channel, is not set up in the serving cells; and each of the serving cells includes the primary cell and the at least one secondary cell.

11 Claims, 15 Drawing Sheets

(56) References Cited

U.S. PATENT DOCUMENTS

2010/0271970 A1* 10/2010 Pan et al. ..................... 370/252
2011/0026478 A1    2/2011 Lee et al.

OTHER PUBLICATIONS

Samsung, "PUCCH HARQ-ACK Resource Indexing for DL CA", 3GPP TSG RAN WG1 #60bis, R1-102171, Apr. 12-16, 2010.

* cited by examiner

METHOD AND APPARATUS FOR TRANSMITTING UPLINK CONTROL INFORMATION IN A CARRIER AGGREGATION SYSTEM

CROSS REFERENCE TO RELATED APPLICATIONS

This application is the National Phase of PCT/KR2011/002957 filed on Apr. 22, 2011, which claims priority under 35 U.S.C. 119(e) to U.S. Provisional Application No. 61/327,082 filed on Apr. 22, 2010 and U.S. Provisional Application No. 61/359,837 filed on Jun. 30, 2010, all of which are hereby expressly incorporated by reference into the present application.

TECHNICAL FIELD

The present invention relates to wireless communication and, more particularly, a method and apparatus for transmitting uplink control information in a carrier aggregation system using multiple carriers.

BACKGROUND ART

In the case of a wide band wireless communication system, effective transmission/reception schemes and utilization schemes have been suggested in order to maximize the efficiency of limited radio resources. One of systems that are taken into account in the next-generation wireless communication system is a carrier aggregation system. A carrier aggregation system means a system for configuring a wide band by aggregating one or more carriers, each having a smaller bandwidth than a wide band that is a target, in order for a wireless communication system to support a wide band.

A wireless communication system, such as a conventional 3rd Generation Partnership Project (3GPP) Long Term Evolution (LTE), uses carriers of various bandwidths, but it is one carrier, that is, single carrier system. In contrast, the next-generation wireless communication system, such as LTE-Advanced (A), can be a carrier aggregation system using an aggregation of multiple carriers, that is, a carrier aggregation.

In a single carrier system, for example, LTE, in uplink in which a mobile station transmits a signal to a base station, a single carrier property is used in order to efficiently utilize the power amplifier of the mobile station. The mobile station uses a control region in which control information is transmitted and a data region in which data is transmitted independently and does not send signals in the control region and the data region at the same time in order to maintain a single carrier property.

In contrast, in a carrier aggregation system, for example, LTE-A, simultaneous transmission in the control region and the data region may be permitted or not permitted depending on a configuration. In a carrier aggregation system, if simultaneous transmission in the control region and the data region is not permitted, a mobile station may need to send control information and data at the same time at a specific point of time. In this case, the mobile station may send the control information and the data in the data region at the same time. This is said that the control information is piggybacked (or multiplexed) and transmitted.

In a carrier aggregation system, if transmission in a data region using a plurality of carriers is scheduled at a point of time at which a mobile station must send control information, there is a problem in that whether the control information has to be piggybacked and transmitted on the data region of what carrier is not clear.

DISCLOSURE

Technical Problem

An object of the present invention is to provide a method and apparatus for transmitting uplink control information in a carrier aggregation system.

Technical Solution

An Uplink Control Information (UCI) transmission method performed by a mobile station in a carrier aggregation system in accordance with an aspect of the present invention includes transmitting UCI through the physical uplink shared channel (PUSCH) of a primary cell in a subframe in which there is PUSCH transmission of the primary cell and transmitting the UCI through the PUSCH of any one of one or more secondary cells if there is PUSCH transmission of the one or more secondary cells in a subframe in which the PUSCH of the primary cell is not transmitted, wherein the mobile station corresponds to a case where two or more serving cells are configured and the simultaneous transmission of the PUSCH that is a data channel and a physical uplink control channel (PUCCH) that is a control channel is not set in the serving cells, and the serving cells comprise the primary cell and the one or more secondary cells.

The any one secondary cell may be a secondary cell having the smallest cell index from among the one or more secondary cells.

The PUSCH of the secondary cell having the smallest carrier index may be the PUSCH of a subframe that is semi-persistently scheduled.

The UCI may be transmitted through the PUCCH of the primary cell in a subframe in which a PUSCH is not transmitted in both the primary cell and the one or more secondary cells.

The UCI may include at least one of periodic channel state information and Hybrid Automatic Repeat Request (HARQ) acknowledgement (ACK).

The method further includes receiving an uplink grant from a base station. Here, the uplink grant may include information on the allocation of resources and information on modulation coding for the one or more secondary cells, and the mobile station may determine a secondary cell in which the UCI will be transmitted based on the information on the allocation of resources or the information on modulation coding.

The information on the allocation of resources may include information on a transmission bandwidth for each of the one or more secondary cells.

The mobile station may transmit the UCI through a secondary cell whose bandwidth indicated by the information on the transmission bandwidth is greater than a predetermined threshold.

The primary cell may be a serving cell in which the mobile station performs an initial connection establishment procedure or a connection re-establishment procedure with a base station.

An Uplink Control Information (UCI) transmission method performed by a mobile station in a carrier aggregation system in accordance with another aspect of the present invention includes selecting a serving cell in which UCI will be transmitted from serving cells configured for the mobile station in relation to a subframe and transmitting the UCI through a Physical Uplink Shared Channel (PUSCH) transmitted in the subframe of the selected serving cell, wherein the selected serving cell is a serving cell that performs a PUSCH transmission of a semi-persistently scheduled subframe.

The serving cells configured for the mobile station may include a primary cell and one or more secondary cells, the mobile station may transmit the UCI through the PUSCH of the primary cell if there is PUSCH transmission of the primary cell in the subframe, and the mobile station may transmit the UCI through a semi-persistently scheduled PUSCH if there is no PUSCH transmission of the primary cell in the subframe and there is transmission of the semi-persistently scheduled PUSCH in any one of the one or more secondary cells.

A mobile station in accordance with yet another aspect of the present invention includes a Radio Frequency (RF) unit transmitting and receiving radio signals and a processor connected to the RF unit, wherein the processor transmits UCI through the physical uplink shared channel (PUSCH) of a primary cell in a subframe in which there is PUSCH transmission of the primary cell and transmits the UCI through the PUSCH of any one of one or more secondary cells if there is PUSCH transmission of the one or more secondary cells in a subframe in which the PUSCH of the primary cell is not transmitted, the mobile station corresponds to a case where two or more serving cells are configured and the simultaneous transmission of the PUSCH that is a data channel and a physical uplink control channel (PUCCH) that is a control channel is not set in the serving cells, and the serving cells comprise the primary cell and the one or more secondary cells.

The any one secondary cell may be a secondary cell having the smallest cell index from among the one or more secondary cells.

The PUSCH of the secondary cell having the smallest carrier index may be the PUSCH of a subframe that is semi-persistently scheduled.

The UCI may be transmitted through the PUCCH of the primary cell in a subframe in which a PUSCH is not transmitted in both the primary cell and the one or more secondary cells.

Advantageous Effects

In accordance with the present invention, there is provided a method of transmitting UCI if two or more carriers are configured for an MS and the simultaneous transmission of a PUCCH and a PUSCH is not permitted in a carrier aggregation system.

MODE FOR INVENTION

The following technologies may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is an evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink LTE-Advanced (LTE-A) is an evolution of LTE.

In order to clarify a description, LTE and LTE-A are chiefly described, but the technical spirit of the present invention is not limited thereto.

Figure 1:
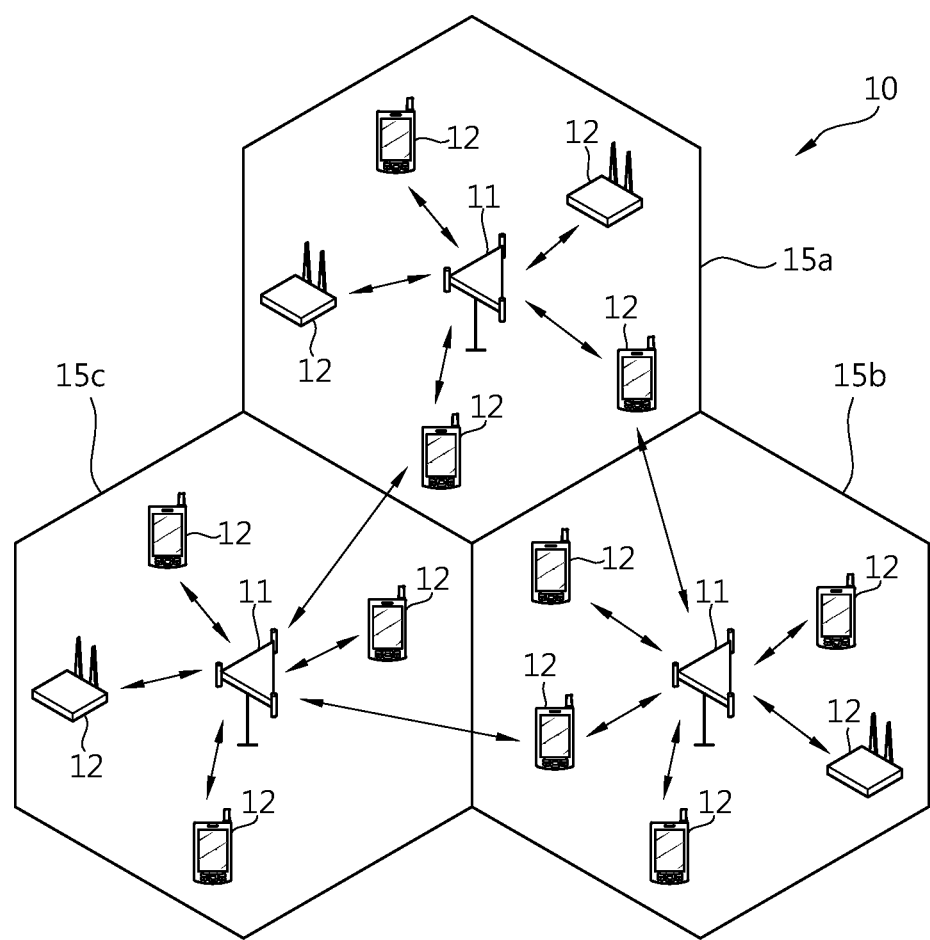
FIG. 1 shows a wireless communication system.

FIG. 1 shows a wireless communication system.

The wireless communication system 10 includes one or more Base Stations (BSs) 11. The BSs 11 provide communication services to respective geographical areas 15a, 15b, and 15c. User Equipment (UE) 12 may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

The BS 11 commonly refers to a fixed station communicating with the MSs 12, and it may also be called another terminology, such as an evolved NodeB (eNB), a Base Transceiver System (BTS), or an access point.

Hereinafter, downlink refers to communication from the BS 11 to the MS 12, and uplink refers to communication from the MS 12 to the BS 11.

The layers of a radio interface protocol between the MS 12 and the BS 11 may be classified into L1 (a first layer), L2 (a second layer), and L3 (a third layer) on the basis of the three lower layers of an Open System Interconnection (OSI) which has been widely known in the communication systems.

A physical layer, that is, the first layer, is connected to a Medium Access Control (MAC) layer placed at a high position through a transport channel. Data is moved between the MAC layer and the physical layer through the transport channel. Furthermore, data is moved through a physical channel between different physical layers, that is, between physical layers on the transmission side and the reception side.

A radio data link layer, that is, the second layer, includes a MAC layer, an RLC layer, and a PDCP layer. The MAC layer is a layer that is responsible for mapping between a logical channel and a transport channel. The MAC layer selects a proper transport channel in order to send data transferred from the RLC layer and adds necessary control information to the header of a MAC Protocol Data Unit (PDU).

The RLC layer is placed at a high position of the MAC layer, and it supports the reliable transmission of data. Furthermore, the RLC layer segments RLC Service Data Units (SDUs) transferred from a higher layer in order to configure data having a size suitable for a radio section and concatenates the segmented SDUs. The RLC layer of a receiver supports a data reassembly function in order to recover original RLC SDUs from received RLC PDUs.

The PDCP layer is used only in a packet exchange region, and it can compress and send the header of an IP packet so that the transmission efficiency of packet data in a radio channel can be increased.

The RRC layer, that is, the third layer, functions to control lower layers and also exchange pieces of radio resource control information between an MS and a network. A variety of RRC states, such as idle mode and RRC connected mode, are defined depending on the communication state of an MS, and the RRC states can be changed according to circumstances. A variety of procedures related to the management of radio resources, such as system information broadcasting, an RRC access management procedure, a multi-component carrier configuration procedure, a radio bearer control procedure, a security procedure, a measurement procedure, and a mobility management procedure (handover), are defined in the RRC layer.

The wireless communication system may be any one of a Multiple-Input Multiple-Output (MIMO) system, a Multiple-Input Single-Output (MISO) system, a Single-Input Single-Output (SISO) system, and a Single-Input Multiple-Output (SIMO) system. An MIMO system uses a plurality of transmit antennas and a plurality of receive antennas. An MISO system uses a plurality of transmit antennas and one receive antenna. An SISO system uses one transmit antenna and one receive antenna. An SIMO system uses one transmit antenna and a plurality of receive antennas. Hereinafter, a transmit antenna means a physical or logical antenna used to send one signal or stream, and a receive antenna means a physical or logical antenna used to receive one signal or stream.

Figure 2:
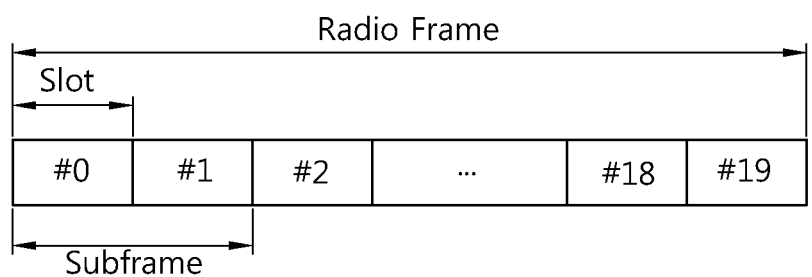
FIG. 2 shows the structure of a radio frame in 3GPP LTE.

FIG. 2 shows the structure of a radio frame in 3GPP LTE.

For the structure, reference may be made to Paragraph 5 of a 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 2, the radio frame includes 10 subframes, and one subframe includes two slots. The slots within the radio frame are assigned slot numbers from #0 to #19. The time that is taken for one subframe to be transmitted is called a Transmission Time Interval (TTI). The TTI may be a scheduling unit for data transmission. For example, the length of one radio frame may be 10 ms, the length of one subframe may be 1 ms, and the length of one slot may be 0.5 ms.

One slot includes a plurality of Orthogonal Frequency Division Multiplexing (OFDM) symbols in the time domain and includes a plurality of subcarriers in the frequency domain. The OFDM symbol is for representing one symbol period because 3GPP LTE uses OFDMA in downlink and may be called another terminology. For example, if SC-FDMA is used as an uplink multi-access scheme, the OFDM symbol may be called an SC-FDMA symbol.

The structure of the radio frame is only an example. Accordingly, the number of subframes included in a radio frame, the number of slots included in a subframe, or the number of OFDM symbols included in a slot may be changed in various ways. In 3GPP LTE, one slot is defined to include 7 OFDM symbols in a normal Cyclic Prefix (CP), and one slot is defined to include 6 OFDM symbols in an extended CP.

A wireless communication system can be basically divided into a Frequency Division Duplex (TDD) method and a Time Division Duplex (TDD) method. In accordance with the FDD method, uplink transmission and downlink transmission are performed while occupying different frequency bands. In accordance with the TDD method, uplink transmission and downlink transmission are performed at different points of time while occupying the same frequency band. Channel responses in the TDD method are substantially reciprocal. This means that a downlink channel response and an uplink channel response in a given frequency domain are almost the same. Accordingly, in a wireless communication system based on TDD, a downlink channel response is advantageous in that it can be obtained from an uplink channel response. In the TDD method, downlink transmission by a BS and uplink transmission by an MS cannot be performed at the same time because uplink transmission and downlink transmission in all frequency bands are time-divided. In a TDD system in which uplink transmission and downlink transmission are classified in a subframe unit, uplink transmission and downlink transmission are performed in different subframes.

Figure 3:
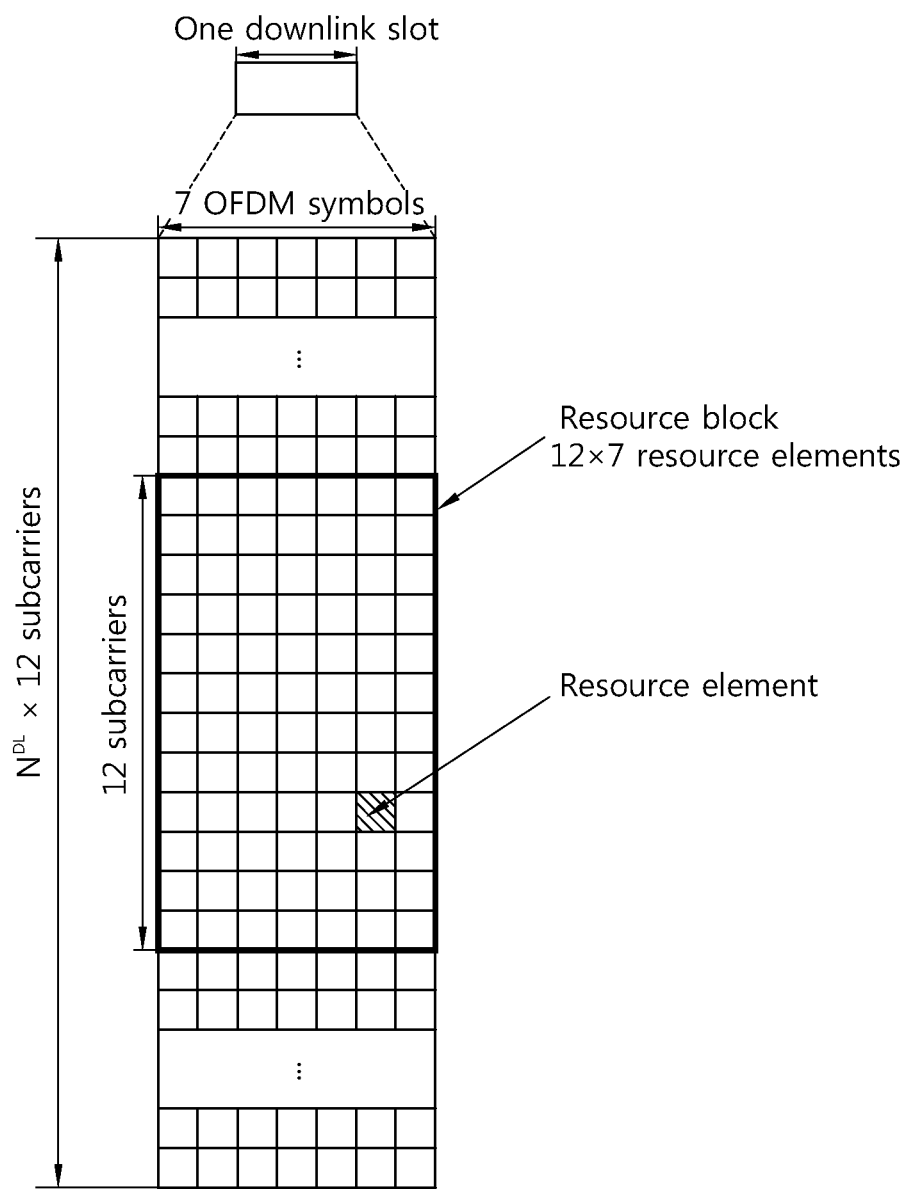
FIG. 3 shows an example of a resource grid for one downlink slot.

FIG. 3 shows an example of a resource grid for one downlink slot.

The downlink slot includes a plurality of OFDM symbols in the time domain and includes an $N_{RB}$ number of Resource Blocks (RBs) in the frequency domain. The resource block is a resource allocation unit, and it includes a plurality of contiguous subcarriers in one slot. The number of resource blocks $N_{RB}$ included in a downlink slot depends on a downlink transmission bandwidth configured in a cell. For example, in an LTE system, the number of resource blocks $N_{RB}$ may be any one of 6 to 110.

Each element on a resource grid is referred to as a resource element. The resource element on the resource grid may be identified by an index pair (k, l) within a slot. Here, k (k=0, $N_{RB} \times 12-1$) is a subcarrier index within the frequency domain, and l (l=0, . . . , 6) is an OFDM symbol index within the time domain.

Here, one resource block is illustrated as including 7×12 resource elements, including 7 OFDM symbols in the time domain and 12 subcarriers in the frequency domain, but the number of OFDM symbols and the number of subcarriers within the resource block are not limited thereto. The number of OFDM symbols and the number of subcarriers may be changed in various ways depending on the length of a CP, frequency spacing, etc. For example, in the case of a normal CP, the number of OFDM symbols is 7, and in the case of an extended CP, the number of OFDM symbols is 6. In one OFDM symbol, one of 128, 256, 512, 1024, 1536, and 2048 may be selected and used as the number of subcarriers. The structure of an uplink slot may be the same as that of the downlink slot.

Figure 4:
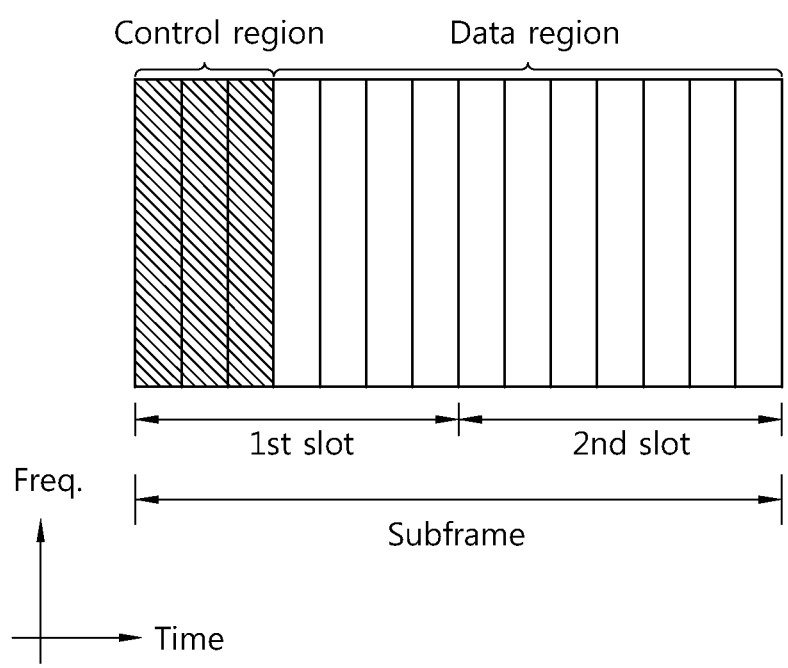
FIG. 4 shows the structure of a downlink subframe.

FIG. 4 shows the structure of a downlink subframe.

The downlink subframe includes 2 slots in the time domain, and each slot includes 7 OFDM symbols in a normal CP. A maximum of former 3 OFDM symbols (a maximum of 4 OFDM symbols in relation to a 1.4 MHz bandwidth) in a first slot within the subframe become a control region to which control channels are allocated, and the remaining OFDM symbols become a data region to which a Physical Downlink Shared Channel (PDSCH) is allocated.

A physical downlink control channel (PDCCH) can carry the resource allocation of a higher layer control message, such as the resource allocation and transport format of a Downlink-Shared Channel (DL-SCH), information on the allocation of resources on an Uplink Shared Channel (UL-SCH), paging information on a PCH, system information on a DL-SCH, and a random access response transmitted on a PDSCH, a set of transmission power control commands for individual UE within a specific UE group, and the activation of a Voice over Internet Protocol (VoIP). A plurality of PDCCHs can be transmitted within the control region, and an MS can monitor a plurality of PDCCHs. A PDCCH is transmitted on one Control Channel Element (CCE) or an aggregation of some contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined depending on a correlation between the number of CCEs and a coding rate provided by the CCEs.

A BS determines a PDCCH format based on DCI that will be transmitted to an MS and attaches a Cyclic Redundancy Check (CRC) to control information. A unique identifier (i.e., a Radio Network Temporary Identifier (RNTI)) is masked to a CRC depending on the owner or use of a PDCCH. If a PDCCH is for a specific MS, an identifier unique to the MS, for example, a Cell-RNTI (C-RNTI) can be masked to a CRC. Or, if a PDCCH is for a paging message, a paging indication identifier, that is, a Paging-RNTI (P-RNTI), can be masked to a CRC. If a PDCCH is for a System Information Block (SIB), a system information identifier, that is, a System Information-RNTI (SI-RNTI), can be masked to a CRC. A Random Access-RNTI (RA-RNTI) can be masked to a CRC in order to indicate a random access response, that is, a response to the transmission of the random access response of an MS.

Figure 5:
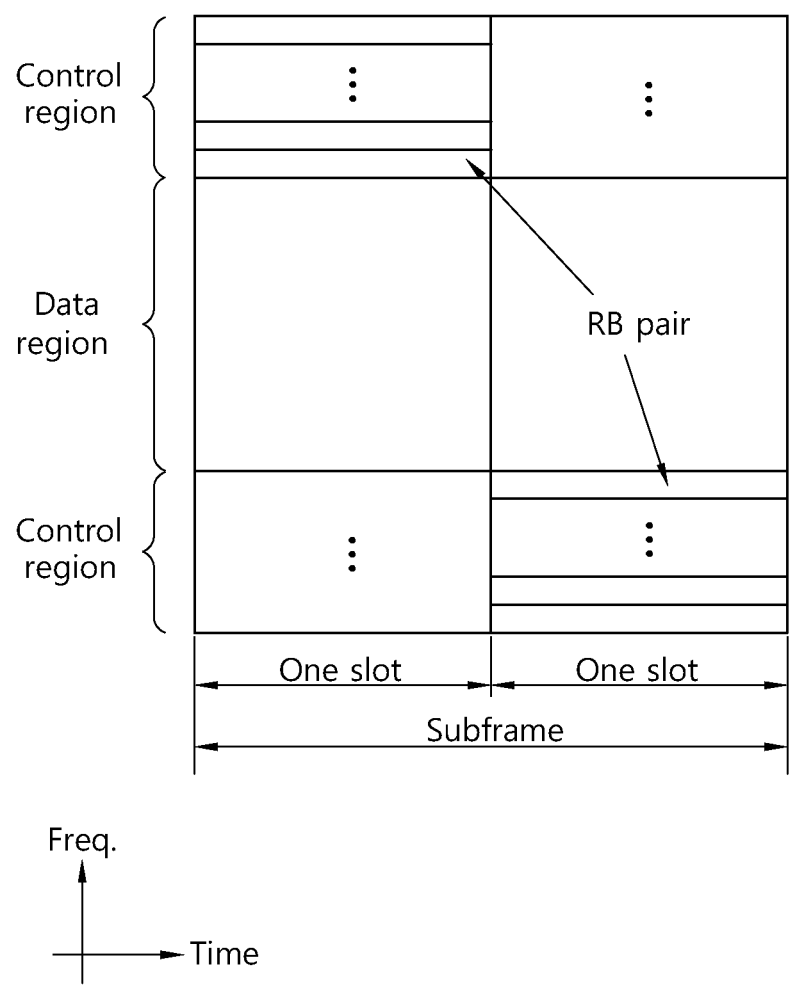
FIG. 5 shows the structure of an uplink subframe.

FIG. 5 shows the structure of an uplink subframe.

The uplink subframe can be divided into a control region and a data region in the frequency domain. A Physical Uplink Control Channel (PUCCH) on which Uplink Control Information (UCI) is transmitted is allocated to the control region. A Physical Uplink Shared Channel (PUSCH) on which uplink data is transmitted is allocated to the data region. In this sense, the control region may be called a PUCCH region, and the data region may be called a PUSCH region. An MS may support the simultaneous transmission of a PUSCH and a PUCCH or may do not support the simultaneous transmission of a PUSCH and a PUCCH depending on configuration information indicated by a higher layer.

A PUSCH is mapped to an Uplink Shared Channel (UL-SCH), that is, a transport channel. Uplink data transmitted on the PUSCH may be a transport block, that is, a data block for an UL-SCH transmitted during a TTI. The transport block may be user information. Or, the uplink data may be multiplexed data. The multiplexed data is obtained by multiplexing a transport block for an UL-SCH and uplink control information. For example, the uplink control information multiplexed into uplink data may include a Channel Quality Indicator (CQI), a Precoding Matrix Indicator (PMI), Hybrid Automatic Repeat Request (HARQ) acknowledgement/not-acknowledgement (ACKNACK), a Rand Indicator (RI), etc. The transmission of uplink control information, together with uplink data, in the data region as described above is called the piggyback transmission of UCI. The piggyback transmission is described in detail later. Only uplink control information may be transmitted in a PUSCH.

A PUCCH for one MS is allocated in the form of resource block (RB) pair in a subframe. Resource blocks that belong to a resource block pair occupy different subcarriers in each of a first slot and a second slot. A frequency occupied by resource blocks that belong to a resource block pair allocated to a PUCCH is changed on the basis of a slot boundary. This is said that an RB pair allocated to a PUCCH has been frequency-hopped in the slot boundary. A frequency diversity gain can be obtained when an MS transmits uplink control information through different subcarriers according to the time.

A PUCCH carries a variety of pieces of control information depending on a format. A PUCCH format 1 carries a Scheduling Request (SR). Here, an On-Off Keying (OOK) method may be used. A PUCCH format 1a carries Acknowledgement/Non-Acknowledgement (ACK/NACK) modulated in accordance with a Binary Phase Shift Keying (BPSK) method in relation to one codeword. A PUCCH format 1b carries ACK/NACK modulated in accordance with a Quadrature Phase Shift Keying (QPSK) method in relation to two codewords. A PUCCH format 2 carries a Channel Quality Indicator (CQI) modulated in accordance with a QPSK scheme. PUCCH formats 2a and 2b carry a CQI and ACK/NACK. A PUCCH format 3 is modulated in accordance with a QPSK scheme, and it can carry a plurality of ACK/NACKs and an SR.

As described above, Uplink Control Information (UCI) can be piggybacked and transmitted on a PUSCH.

Figure 6:
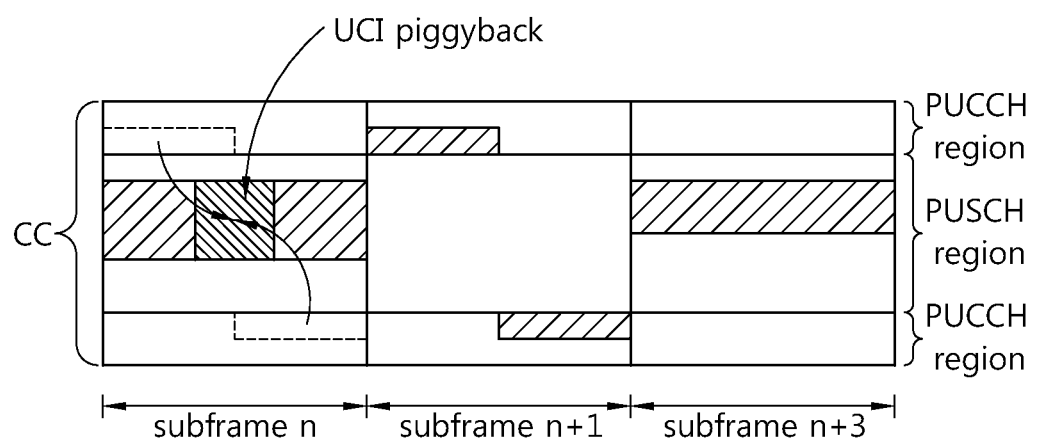
FIG. 6 shows an example of a subframe in which uplink control information is piggybacked (multiplexing) and transmitted.

FIG. 6 shows an example of a subframe on which UCI is piggybacked (multiplexing) and transmitted.

Referring to FIG. 6, an MS does not send UCI in a PUCCH region in a subframe n, but transmits the UCI together with uplink data in a PUSCH region. In contrast, the MS transmits UCI only through the PUCCH region in a subframe n+1 and transmits uplink data through only the PUSCH region in a subframe n+2. The simultaneous transmission of data and UCI in the PUSCH region as in the subframe n is called piggyback transmission of UCI.

In 3GPP LTE Rel-8, in order to efficiently utilize the power amplifier of an MS in uplink, a single carrier property having an excellent Peak-to-Average Power Ratio (PAPR) characteristic and an excellent Cubic Metric (CM) characteristic that influence the performance of the power amplifier is maintained. In 3GPP LTE Rel-8, in the case of PUSCH transmission, data to be transmitted is subject to Discrete Fourier Transform (DFT) spreading in order to maintain a single carrier property. In the case of PUCCH transmission, control information is carried on a sequence having a single carrier property and transmitted in order to maintain a single carrier property. However, if data on which DFT spreading has been performed is allocated to non-contiguous subcarriers in the frequency domain or a PUSCH and a PUCCH are transmitted at the same time, a single carrier property cannot be maintained. Accordingly, if the simultaneous transmission of a PUCCH and a PUSCH is scheduled in the same subframe, a single carrier property can be maintained by transmitting UCI that will be transmitted on the PUCCH, together with data, on the PUSCH, that is, piggybacking and transmitting the UCI.

Figure 7:
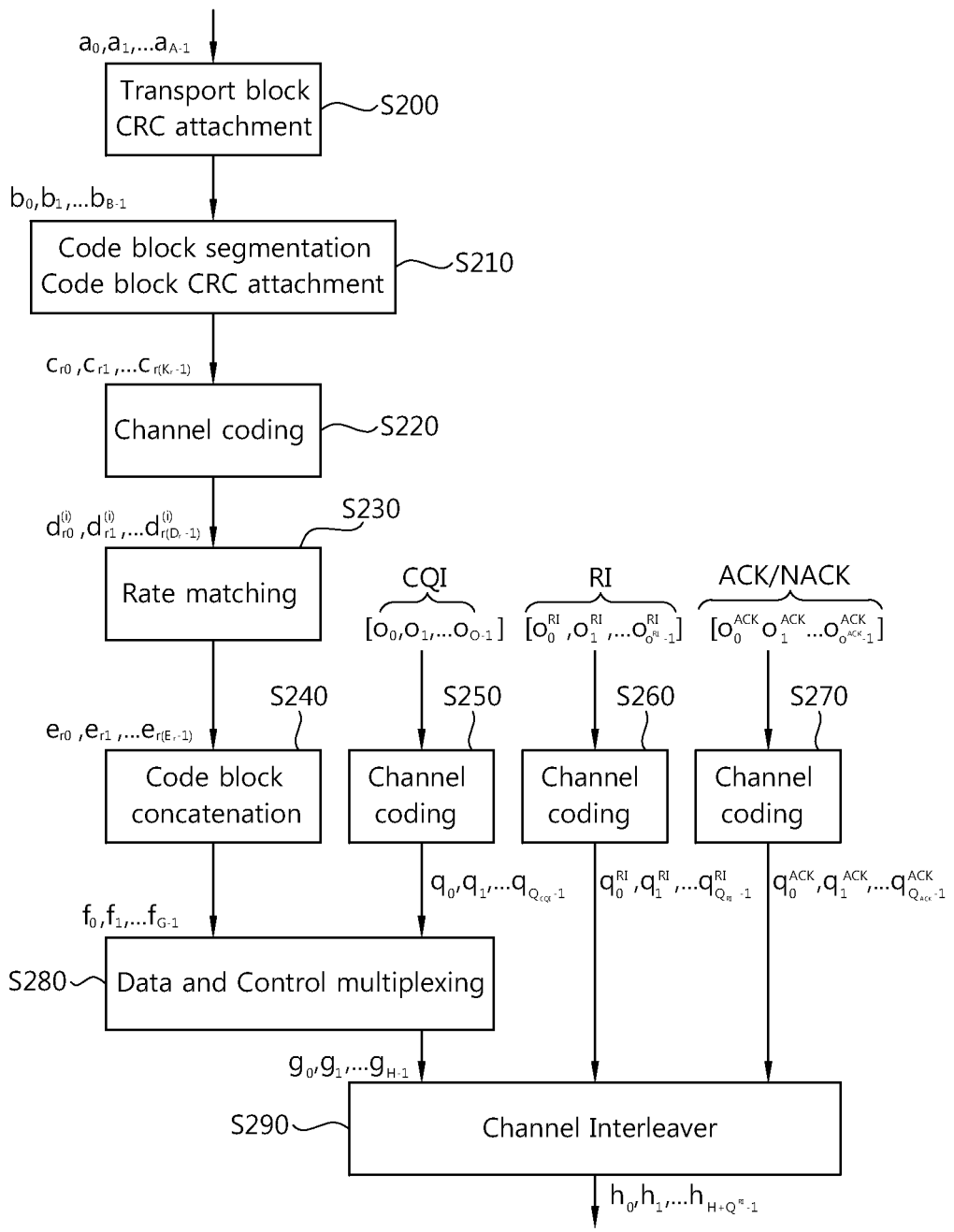
FIG. 7 shows a process of processing uplink data and uplink control information when the uplink control information is piggybacked (multiplexing) and transmitted on a PUSCH.

FIG. 7 shows a process of processing uplink data and UCI when the UCI is piggybacked (multiplexing) and transmitted on a PUSCH.

Referring to FIG. 7, data bits $a_0, a_1, \ldots, a_{A-1}$ are given in the form of one transport block every TTI. First, Cyclic Redundancy Check (CRC) parity bits $p_0, p_1, \ldots, p_{L-1}$ are added to the data bits $a_0, a_1, \ldots, a_{A-1}$, thereby generating CRC-added bits $b_0, b_1, \ldots, b_{B-1}$ (S200). Here, the subscripts B, A, and L have a relation of B=A+L. A relation between $a_k$ and $b_k$ can be given as follows.

$$b_k = a_k \text{ for } k=0, 1, \ldots, A-1$$

$$b_k = p_{k-A} \text{ for } k=A, A+1, \ldots, A+L-1 \quad \text{[Equation 1]}$$

The CRC-added bits $b_0, b_1, b_{B-1}$ are segmented in a code block unit, and the CRC parity bits are added again in a code block unit (S210). A bit sequence output after the code block segmentation is called $c_{r0}, c_{r1}, \ldots, c_{r(Kr-1)}$. Here, assuming that a total number of the code blocks is C, r refers to a code block number and $K_r$ is the number of bits for the code block number r.

A bit sequence for a given code block is subject to channel coding (S220). Encoded bits are indicated by $d^{(i)}_0, d^{(i)}_1, \ldots, d^{(i)}_{D-1}$, D is the number of encoded bits per output stream, and i is the index of the output bit stream of an encoder.

The encoded bits is subject to rate matching (S230) and code blocks are concatenated (S240), thereby generating a data bit sequence $f_0, f_1, \ldots, f_{G-1}$. Here, G indicates a total number of encoded bits used for transmission other than bits used to send control information when the control information is multiplexed on a PUSCH.

Meanwhile, control information (uplink control information), together with data (uplink data), can be multiplexed. The data and the control information can use different coding rates by allocating a different number of coded symbols for transmitting each of the data and the control information. The control information includes a Channel Quality Indicator (CQI), a Rank Indicator (RI), ACK/NACK (acknowledgement/not-acknowledgement), etc.

A CQI $o_0, o_1, \ldots, o_{o-1}$ (O is the number of bits of the CQI) is subject to channel coding, thereby generating a control information bit sequence $q_0, q_1, \ldots, q_{QCQI-1}$ (S250). A RI $o_0^{RI}, o_1^{RI}, \ldots, o_{oRI-1}^{RI}$ is subject to channel coding, thereby generating a control information bit sequence $q_0^{RI}, q_1^{RI}, \ldots, q_{QRI-1}^{RI}$ (S260). Likewise, ACK/NACK $o_0^{ACK}, o_1^{ACK}, \ldots, o_{oACK-1}^{ACK}$ is subject to channel coding, thereby generating a control information bit sequence $q_0^{ACK}, q_1^{ACK}, \ldots, q_{QACK-1}^{ACK}$ (S270).

The generate data bit sequence $f_0, f_1, \ldots, f_{G-1}$ and the control information bit sequence $q_0, q_1, q_{QCQI-1}$ of the CQI are multiplexed into a multiplexed sequence $g_0, g_1, \ldots, g_{H-1}$ (S280). When the multiplexing is performed, the control information bit sequence $q_0, q_1, \ldots, q_{QCQI-1}$ of the CQI may be first disposed and the data bit sequence $f_0, f_1, \ldots, f_{G-1}$ may be then disposed. That is, when H=G+Q, $[g_0, g_1, \ldots, g_{H-1}]=[q_0, q_1, \ldots, q_{QCQI-1}, f_0, f_1, \ldots, f_{G-1}]$ may be configured.

The multiplexed sequence $g_0, g_1, \ldots, g_{H-1}$ is mapped to a modulation sequence $h_0, h_1, \ldots, h_{H'-1}$ by a channel interleaver (S280). Furthermore, the control information bit sequence of the RI or ACK/NACK is mapped to the modulation sequence $h_0, h_1, \ldots, h_{H'-1}$ by the channel interleaver. Here, $h_i$ is a modulation symbol on a constellation, and H'=H+$Q_{RI}$. Each modulation symbol of the modulation sequence $h_0, h_1, h_{H'-1}$ is mapped to a resource element for a PUSCH. The resource element is an allocation unit on a subframe that is defined by one SC-FDMA symbol (or OFDMA symbol) and one subcarrier.

Figure 8:
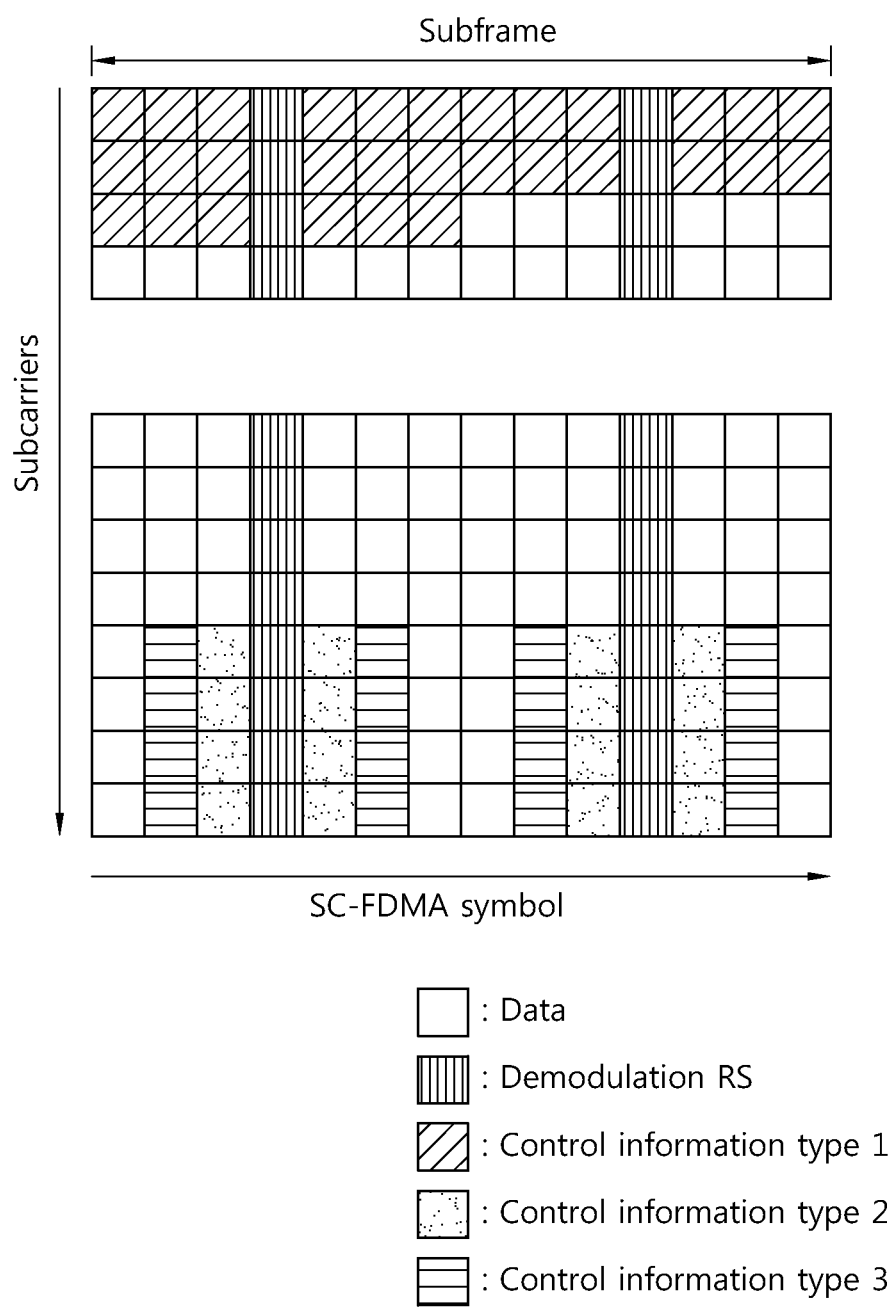
FIG. 8 shows an example in which resources are mapped to the PUSCH region of a subframe n of FIG. 6 through a processing process, such as that shown in FIG. 7.

FIG. 8 shows an example in which resources are mapped to the PUSCH region of the subframe n of FIG. 6 through a processing process, such as that shown in FIG. 7.

A multiplexing method in a PUSCH region may be different depending on the type of control information. As shown in FIG. 8, in the PUSCH region of a subframe, a demodulation reference signal (DMRS) is allocated to only symbol in a first slot or a second slot. The DMRS is a reference signal that is used to demodulate uplink data and uplink control information transmitted in the PUSCH region. FIG. 8 shows an example in which a DMRS is allocated to the fourth symbol of a first slot and a second slot.

Some of the uplink control information, for example, CQI/PMI (control information type 1) may be allocated to the first symbol to the last symbol of a subframe in relation to one subcarrier and then to a next subcarrier in the frequency domain. That is, the CQI/PMI may be allocated to symbols from the first symbol to the last symbol of a subframe other than symbols to which the DMRS is allocated.

The remainder of the uplink control information, for example, ACK/NACK (control information type 2) may be allocated to a symbol contiguous to a symbol to which the DMRS is allocated. The number of symbols to which the ACK/NACK may be allocated may be a maximum of 4. If this allocation method is used, ACK/NACK may use the best channel estimation results. ACK/NACK may be allocated to a symbol contiguous to symbols to which a DMRS is allocated after puncturing data, that is, PUSCH data. A RI (control information type 3) may be allocated to a symbol contiguous to symbols to which ACK/NACK is allocated.

The piggyback transmission of UCI, such as that described above, can be applied to a carrier aggregation system. First, a carrier aggregation system is described.

Figure 9:
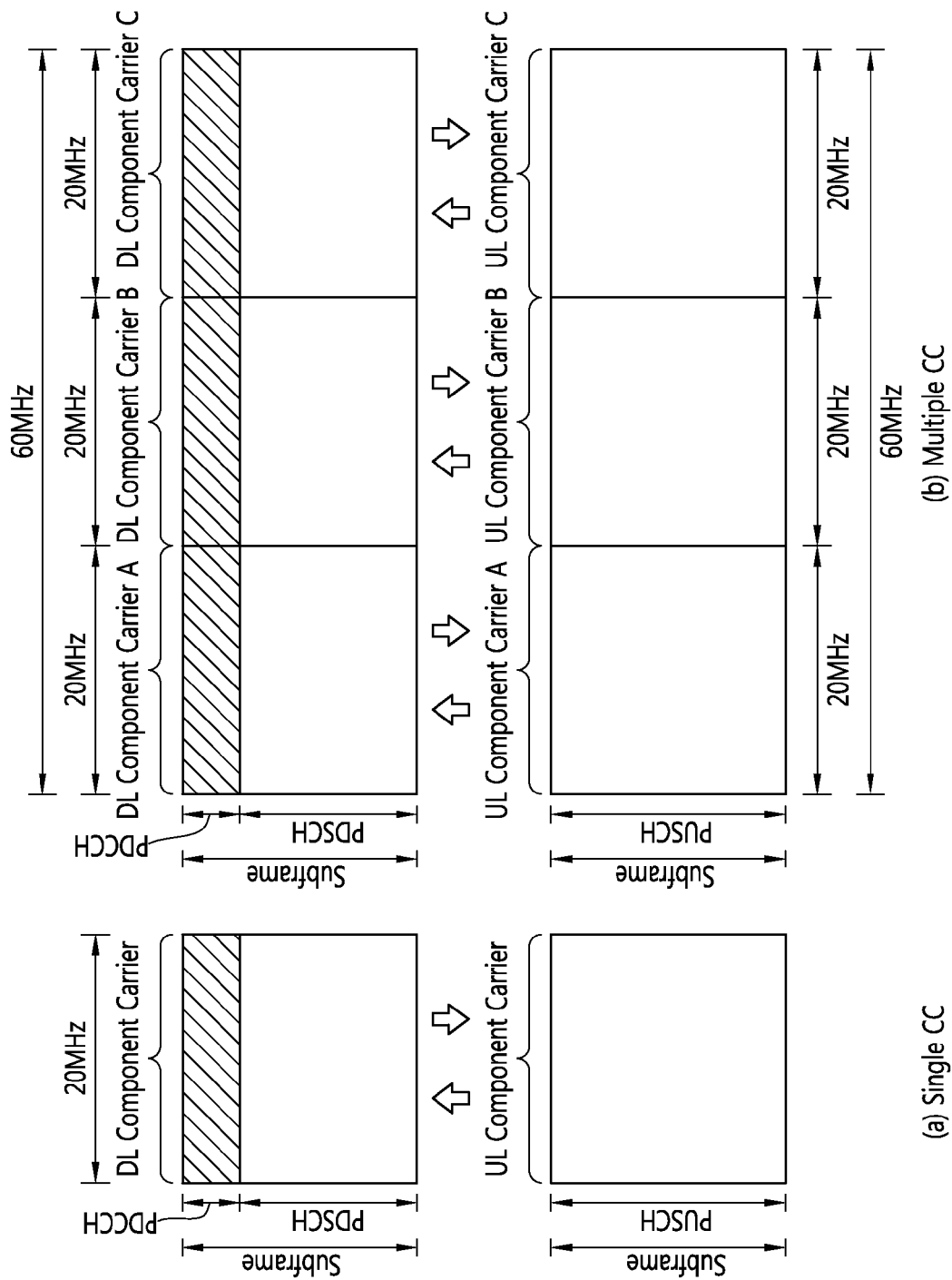
FIG. 9 is an example of a comparison between a single carrier system and a carrier aggregation system.

FIG. 9 is an example of a comparison between a single carrier system and a carrier aggregation system.

Referring to FIG. 9, in a single carrier system, only one carrier is supported for an MS in uplink and downlink. The bandwidth of a carrier may be various, but the number of carriers allocated to an MS is one. In contrast, in a Carrier Aggregation (CA) system, a plurality of component carriers DL CCs A to C and UL CCs A to C may be allocated to an MS. For example, in order to allocate a bandwidth of 60 MHz to an MS, three Component Carriers (CCs) each having 20 MHz may be allocated.

A carrier aggregation system may be divided into a contiguous carrier aggregation system in which carriers are contiguous to each other and a non-contiguous carrier aggregation system in which carriers are spaced apart from each other. When simply describing a carrier aggregation system hereinafter, it is to be noted that both a case where CCs are contiguous to each other and a case where CCs are not contiguous to each other are included.

A CC that is the subject when aggregating one or more CCs may use bandwidths used in the existing system for the purpose of backward compatibility with the existing system. For example, in a 3GPP LTE system, bandwidths of 1.4 MHz, 3 MHz, 5 MHz, 10 MHz, 15 MHz, and 20 MHz are supported. In a 3GPP LTE-A system, a wide band of 20 MHz or higher can be configured using only the bandwidths of the 3GPP LTE system. Or, a wide band may be configured by defining a new bandwidth without using the bandwidths of the existing system.

The system frequency band of a wireless communication system is classified into a plurality of carrier frequencies.

Here, the carrier frequency means the center frequency of a cell. Hereinafter, a cell may mean downlink frequency resources and uplink frequency resources. Or, the cell may mean a combination of downlink frequency resources and optional uplink frequency resources. Furthermore, in general, if a Carrier Aggregation (CA) is not taken into account, uplink and downlink frequency resources may always form a pair in one cell.

In order for packet data to be transmitted and received through a specific cell, an MS first has to complete a configuration for the specific cell. Here, the configuration means a state in which system information necessary to transmit and receive data has been received in relation to a corresponding cell. For example, the configuration may include an overall procedure for receiving common physical layer parameters necessary for data transmission/reception, MAC layer parameters, or parameters necessary for a specific operation in the RRC layer. A cell on which a configuration has been completed immediately becomes a state in which the cell can transmit and receive packets if it receives information on which packet data can be transmitted.

A cell on which a configuration has been completed may have an activation or deactivation state. Here, the activation means that the transmission or reception of data is being carried out or the transmission or reception of data is in a ready state. An MS can monitor and receive the control channel (PDCCH) and data channel (PDSCH) of an activated cell in order to check resources (they may be the frequency, the time, etc.) allocated thereto.

The deactivation means that the transmission or reception of traffic data is impossible and measurement or the transmission and reception of minimum information is possible. An MS can receive System Information (SI) necessary to receive packets from a deactivated cell. In contrast, an MS does not monitor or receive the control channel (PDCCH) and data channel (PDSCH) of a deactivated cell in order to check resources (they may be the frequency, the time, etc.) allocated thereto.

A cell may be classified into a primary cell, a secondary cell, and a serving cell.

A primary cell means a cell operating in a primary frequency, a cell in which an MS performs an initial connection establishment procedure or a connection re-establishment procedure with a BS, or a cell designated as the primary cell in a handover procedure.

The secondary cell means a cell operating in a secondary frequency. Once RRC establishment is set up, the secondary cell is used to provide configured and additional radio resources.

The serving cell is configured as the primary cell in the case of an MS in which a carrier aggregation has not been configured or which cannot provide a carrier aggregation. If a carrier aggregation has been configured, the term 'serving cell' is used to indicate the primary cell and one of all secondary cells or a set of a plurality of cells.

That is, the primary cell means one serving cell that provides security inputs and NAS mobility information in an RRC establishment or re-establishment state. At least one cell, together with the primary cell, may be configured to form a set of serving cells depending on the capabilities of an MS. The at least one cell is the above-described secondary cell.

Accordingly, a set of serving cells configured to one MS may include only one primary cell or may include one primary cell and at least one secondary cell.

A Primary Component Carrier (PCC) means a CC corresponding to the primary cell. A PCC is a CC on which an MS initially sets up connection or RRC connection with BS, from among some CCs. A PCC is a special CC which is responsible for connection or RRC connection for signaling regarding a plurality of CCs and that manages UE context, that is, connection information related to UE. Furthermore, a PCC always has an activation state when it sets up connection with an MS and has RRC connected mode. A downlink component carrier corresponding to the primary cell is called a downlink primary component carrier (DL PCC), and an uplink component carrier corresponding to the primary cell is called an uplink primary component carrier (UL PCC).

A Secondary Component Carrier (SCC) means a CC corresponding to the secondary cell. That is, an SCC is a CC allocated to an MS other than a PCC. An SCC is a carrier extended by an MS for additional resource allocation other than a PCC and may be divided into an activation or deactivation state. A downlink component carrier corresponding to the secondary cell is called downlink secondary component carrier (DL SCC), and an uplink component carrier corresponding to the secondary cell is called an uplink secondary component carrier (UL SCC).

The primary cell and the secondary cell have the following characteristics.

First, the primary cell is used to transmit a PUCCH.

Second, the primary cell is always activated, whereas the secondary cell is a carrier that is activated or deactivated depending on a specific condition.

Third, RRC re-establishment is triggered when the primary cell experiences a Radio Link Failure (hereinafter referred to as an RLF), but RRC re-establishment is not triggered when the secondary cell experiences an RLF.

Fourth, the primary cell may be changed by a change of a security key or by a handover procedure accompanied by a random access channel (RACH) procedure.

Fifth, Non-Access Stratum (NAS) information can be received through the primary cell.

Sixth, a DL PCC and an UL PCC are always paired in the primary cell.

Seventh, a different Component Carrier (CC) for each MS may be configured as the primary cell.

Eighth, procedures, such as the reconfiguration, addition, and removal of the primary cell, can be performed by the RRC layer. In adding a new secondary cell, RRC signaling may be used to send system information on a dedicated secondary cell.

In relation to a component carrier that configures the serving cell, a downlink component carrier may configure one serving cell, and a downlink component carrier and an uplink component carrier may be connection-established to configure one serving cell. However, only one uplink component carrier does not configure the serving cell.

The activation/deactivation of a component carrier have the same meaning at the activation/deactivation of the serving cell. For example, assuming that a serving cell 1 is configured using a DL CC1, the activation of the serving cell 1 means the activation of the DL CC1. Assuming that a DL CC2 and an UL CC2 are connection-established in a serving cell 2, the activation of the serving cell 2 means the activation of the DL CC2 and the UL CC2. In this sense, each component carrier may correspond to a cell.

The number of component carriers aggregated between downlink and uplink may be differently set. A case where the number of downlink CCs is equal to the number of uplink CCs is called a symmetric aggregation, and a case where the number of downlink CCs is different from the number of uplink CCs is called an asymmetric aggregation. Furthermore, the size (i.e., a bandwidth) of a CC may be different. For example, assuming that 5 CCs are used to configure a band of 70 MHz, a 5 MHz CC (carrier #0)+a 20 MHz CC (carrier #1)+a 20 MHz CC (carrier #2)+a 20 MHz CC (carrier #3)+a 5 MHz CC (carrier #4) may be configured.

As described above, in a carrier aggregation system, unlike in a single carrier system, a plurality of serving cells, that is, a plurality of Component Carriers (CCs) can be supported. That is, one MS can receive a plurality of PDSCHs through a plurality of DL CCs. Furthermore, an MS can send uplink control information through one UL CC of a plurality of UL CCs, for example, the PUCCH of an UL PCC. In a carrier aggregation system, however, the simultaneous transmission of a PUCCH and a PUSCH may be configured in an MS, or the simultaneous transmission of a PUCCH and a PUSCH may not be configured in an MS.

If the simultaneous transmission of a PUCCH and a PUSCH is not configured, an MS has to piggyback or multiplex uplink control information on the PUSCH when there is PUSCH transmission in a subframe in which the uplink control information has to be transmitted. If there is PUSCH transmission in a plurality of carriers in a subframe in which uplink control information has to be transmitted, however, there is a problem in that the uplink control information has to be piggybacked or multiplexed on the PUSCH of what carrier. Hereinafter, if a plurality of serving cells is configured in an MS and the simultaneous transmission of a PUCCH and a PUSCH is not set, how uplink control information will be piggybacked or multiplexed on the PUSCH of what carrier and transmitted is described.

I. Method 1: Method Using a Specific Field of an UPLINK GRANT.

This method is a method of including a 1-bit piggyback field in an uplink grant (PUSCH scheduling grant). For example, a BS may send uplink grants for a plurality of serving cells that are allocated to an MS. Here, the 1-bit piggyback field may be included in the uplink grant for each serving cell, and a specific one of the plurality of serving cells may piggyback and transmit UCI depending on the value of the piggyback field. For example, if a carrier #1, a carrier #2, and a carrier #3 are configured for an MS as serving cells, a BS may send an uplink grant for each of the carriers through a DL PCC. That is, the BS may send an uplink grant #1, an uplink grant #2, and an uplink grant #3. Here, the uplink grant may include a Carrier Indicator Field (CIF) for identifying an uplink grant for what carrier. The MS may piggyback and transmit UCI on a corresponding carrier when the value of the piggyback field included in each uplink grant is, for example, If an MS has received an uplink grant, the piggyback field values of all the uplink grant may be '0'. In this case, the MS may operate as follows.

1. The MS drops the PUSCH transmission of all carriers or some carriers on which the uplink grants have been received, for example, carriers on which a PUCCH is transmitted for UCI transmission and transmits only the PUCCH.

2. The MS drops the UCI transmission and transmits only the PUSCH on which the uplink grants have been received.

3. The MS transmits the PUSCH on which the uplink grants have been received and the PUCCH including the UCI at the same time. The PUCCH can be transmitted through a UL PCC.

II. Method 2: Method of Piggybacking and Transmitting all PUSCHs as Possible.

The method 2 is a method of an MS piggybacking and transmitting UCI on the PUSCHs of all carriers scheduled therefore. For example, if an MS has received uplink grants for a subframe n including a carrier #1, a carrier #2, and a carrier #3, the MS may repeatedly load UCI onto a PUSCH that is transmitted in the subframe n of the carrier #1, the carrier #2, and the carrier #3 and transmit the UCI. Here, unnecessary overhead may occur a little, but this redundant transmission does not result in great overhead because the amount of UCI payload is smaller than the amount of data payload of the PUSCH.

If UCI is transmitted redundantly, a method of transmitting retransmission packets may be used using a different Redundancy Version (RV) in each carrier in an HARQ transmission method. That is, if the USI is piggybacked and transmitted through a plurality of PUSCHs, coded UCI having a different puncturing pattern may be transmitted. In this case, a BS can perform joint decoding on pieces of the UCI transmitted through the PUSCH of respective carriers. Accordingly, there is an advantage in that the reception rate of the BS can be increased.

III. Method 3: Method of Determining a PUSCH on which UCI will be Piggybacked and Transmitted Using a Threshold Value.

This method is a method of determining carriers to which UCI will be piggybacked or multiplexed by taking a bandwidth, Modulation Coding Scheme (MCS), etc. of a scheduled PUSCH into consideration when UCI is piggybacked and transmitted on the PUSCH.

Figure 10:
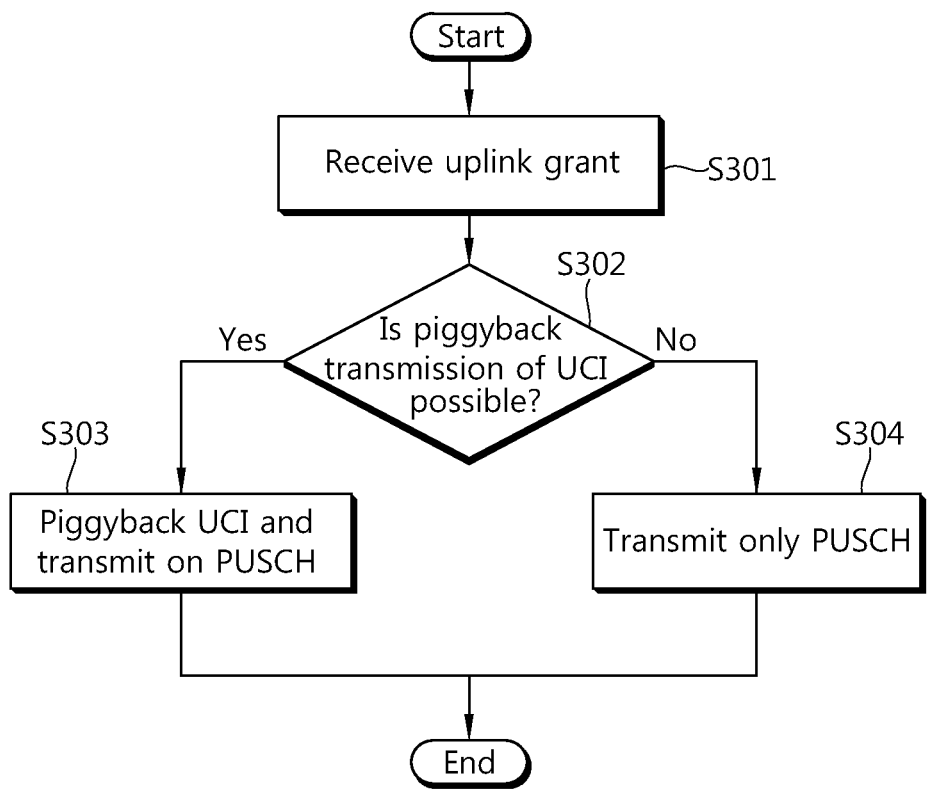
FIG. 10 shows a method of piggybacking and transmitting UCI in accordance with an embodiment of the present invention.

FIG. 10 shows a method of piggybacking and transmitting UCI in accordance with an embodiment of the present invention. FIG. 10 is an example of the method 3.

Referring to FIG. 10, an MS receives uplink grants from a BS (S301). The MS may receive a plurality of uplink grants for a plurality of serving cells in a Carrier aggregation (CA), that is, in the state in which the plurality of serving cells has been configured for the MS. The uplink grant includes information on a bandwidth, an MCS level, etc. for the PUSCH transmission of the serving cell.

The MS determines whether or not the piggyback transmission of UCI is possible for each of the serving cells based on the information on the uplink grants (S302). For example, the MS may determine whether or not the piggyback transmission of the UCI is possible depending on whether a bandwidth for PUSCH transmission is greater than a predetermined threshold bandwidth $BW_{th}$ or not. That is, if the bandwidth for PUSCH transmission is greater than $BW_{th}$, the MS may determine that the piggyback transmission of the UCI for a corresponding serving cell (UL CC) is possible.

Or, the MS may determine whether or not the piggyback transmission of the UCI is possible in the PUSCH of a corresponding serving cell depending on whether the modulation order of an MCS level for PUSCH transmission is smaller than a predetermined threshold or not.

The method of puncturing a resource element on which PUSCH data will be transmitted and loading and transmitting UCI onto the corresponding resource element as described with reference to FIG. 8 may be used as the method of piggybacking and transmitting UCI. Accordingly, it is preferred that a serving cell (UL CC) in which the least PUSCH data is punctured be selected and UCI be piggybacked and transmitted. In this point of view, it is preferred that an MS piggyback UCI to the PUSCH of a serving cell having the lowest modulation order of an MCS level.

The determination step may be differentially applied depending on the type of UCI. For example, a different threshold may be applied depending on each piece of UCI if the amount of UCI that must be piggybacked and transmitted is great or if there are different types of pieces of UCI.

For example, if UCI that must be transmitted includes both ACK/NACK and a CQI, a bandwidth threshold or modulation order for the ACK/NACK and a bandwidth threshold or modulation order for the CQI may be differently configured.

That is, a different threshold may be applied to different UCI. If a different threshold is applied as described above, the ACK/NACK may be given priority over the CQI. For example, if both ACK/NACK and a CQI have to be transmitted, but a bandwidth allocated to a PUSCH is narrow, the ACK/NACK may be transmitted and the transmission of the CQI may be dropped.

Furthermore, if a bandwidth is narrow to the extent that all of a plurality of ACK/NACKs for a plurality of PDSCHs cannot be transmitted on a PUSCH or a modulation order is high, the following method may be taken into consideration.

1. Method of bundling and piggybacking ACK/NACKs for some carriers or all carriers. In this method, spatial bundling (this may be called carrier bundling), such as a method of transmitting ACK if all ACK/NACKs for a plurality of carriers are ACK and transmitting NACK in other cases, may be used. That is, the ACK/NACKs may be compressed and transmitted.

2. Method of piggybacking only the ACK/NACK of a specific DL CC to a PUSCH.

3. Method of dropping the transmission of a PUSCH transmitted through a predetermined carrier or all carriers and transmitting ACK/NACK through a PUCCH.

In the determination step (S302), if it is determined that the number of serving cells in which the piggyback transmission of the UCI is possible is plural, the MS may select a serving cell having the greatest bandwidth and a serving cell having the smallest modulation order, piggyback the UCI on the PUSCH of the corresponding serving cell (UL CC), and send the UCI.

In the determination step (S302), if it is determined that the piggyback transmission of the UCI is possible, the MS piggybacks the UCI on the PUSCH of the corresponding serving cell and transmits the UCI (S303). In contrast, if it is determined that the piggyback transmission of the UCI is impossible in the determination step (S302), the transmission of the UCI may be dropped and only the PUSCH may be transmitted (S304). Or, although not shown in FIG. 10, the MS may drop the transmission of the PUSCH and transmit only the UCI on the PUCCH.

On the PUSCH of what carrier will UCI be piggybacked and multiplexed is described below if a plurality of serving cells is configured for an MS, the simultaneous transmission of a PUCCH and a PUSCH is not set, and the transmission of a Semi-Persistent Scheduling (SPS) PUSCH is set in a specific serving cell (UL CC).

First, SPS-PUSCH transmission is described.

In LTE, an MS can be informed of whether or not semi-persistent transmission/reception are performed in what subframes through a higher layer signal, such as Radio Resource Control (RRC). Parameters given through the higher layer signal can be, for example, the period and offset value of a subframe.

When the MS receives the activation or release signal of SPS transmission through a PDCCH after recognizing semi-persistent transmission through the RRC signaling, the MS performs or releases the transmission of an SPS-PUSCH. That is, the MS does not immediately transmit the SPS PUSCH although the SPS-PUSCH is allocated thereto through RRC signaling, but transmits the SPS-PUSCH in a subframe corresponding to the period and offset value of a subframe allocated through RRC signaling by applying frequency resources (resource block) according to the allocation of a resource block, modulation based on MCS information, and a coding rate that are designated by a PDCCH when receiving the activation or release signal through the PDCCH. If a release signal is received through the PDCCH, the MS stops the transmission of the SPS PUSCH. The transmission of the SPS-PUSCH stopped as described above is started again using frequency resources, an MCS, etc. designated by a PDCCH when the PDCCH including an activation signal is received.

A PDCCH for SPS configuration/release may be called an SPS allocation PDCCH, and a PDCCH for a common PUSCH may be called a dynamic PDCCH. Thus, an MS can validate whether a PDCCH is an SPS allocation PDCCH or not if all the following conditions are satisfied. 1. CRC parity bits obtained from a PDCCH payload have been scrambled into an SPS C-RNTI, 2. The value of a new data indicator field must be '0'. Furthermore, if the field values of a PDCCH are set for each DCI format like in field values in the following table, an MS receives DCI information on a corresponding PDCCH as SPS activation or release.

TABLE 1

| | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 1 shows the field values of an SPS allocation PDCCH for validating SPS activation.

TABLE 2

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 2 shows the field values of an SPS allocation PDCCH for validating SPS release.

Hereinafter, on the PUSCH of what carrier will UCI be piggybacked or multiplexed is described if the transmission of a PUSCH according to SPS, that is, the transmission of an SPS-PUSCH is configured in a specific serving cell (UL CC) and data on a PUSCH.

Figure 11:
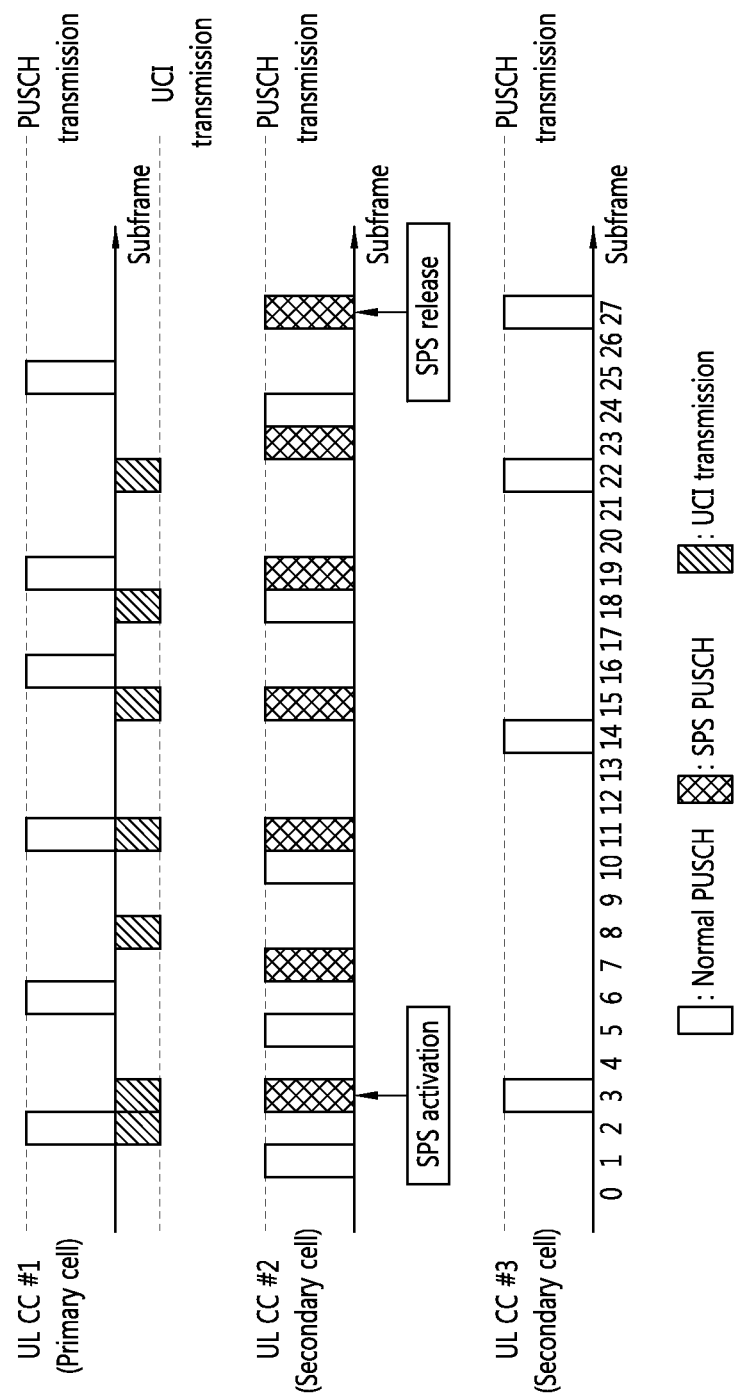
FIG. 11 shows a situation in which an MS tries to send UCI and data on a PUSCH.

FIG. 11 shows a situation in which an MS tries to send UCI and data on a PUSCH.

Referring to FIG. 11, it is assumed that three serving cells (UL CCs), that is, a UL CC #1, a UL CC #2, and a UL CC # are configured for an MS and the UL CC #1 is a UL PCC. That is, the UL CC #1 is a UL PCC that forms a primary cell, and the UL CC #2 and the UL CC #3 are UL CCs that form secondary cells. The MS can perform SPS-PUSCH transmission through any one of the plurality of serving cells. FIG. 11 illustrates that SPS-PUSCH transmission is possible through the UL CC #2 and illustrates that SPS is activated in the subframe 3 of the UL CC #2 and the SPS is released in the subframe 27 thereof. An SPS transmission period is a 4 subframe unit. The MS may need to send UCI in subframes 1, 2, 8, 11, 15, 18, and 22.

A method of an MS transmitting uplink control information according to the present invention is described below by taking the situation of FIG. 11 as an example.

Figure 12:
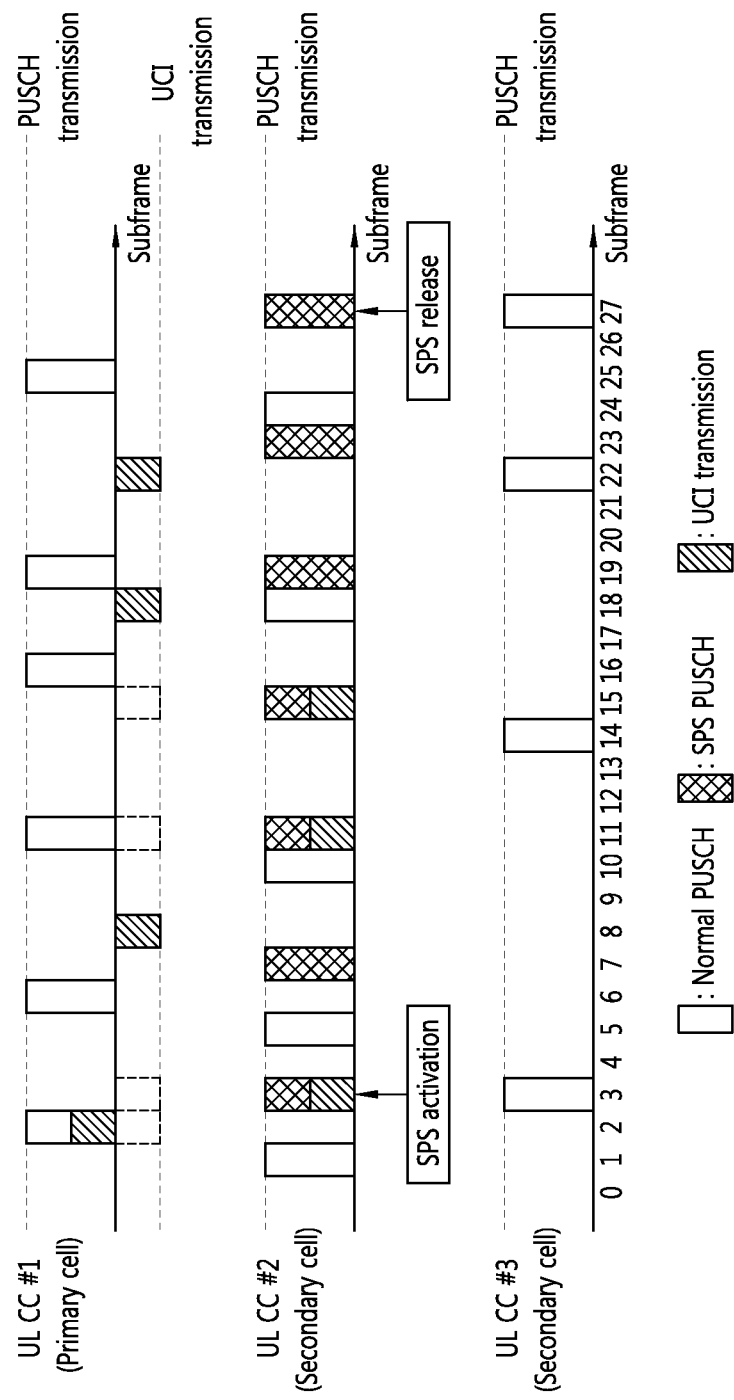
FIG. 12 shows a first example in which UCI is piggybacked.

FIG. 12 shows a first example in which UCI is piggybacked.

Referring to FIG. 12, an MS preferentially piggybacks UCI on an SPS-PUSCH in a subframe in which the SPS-PUSCH is transmitted. For example, if UCI has to be transmitted in subframes 3, 11, and 15, an MS piggybacks the UCI on the SPS-PUSCH of an UL CC #2 in which the SPS-PUSCH is transmitted and transmits the UCI. If there is no SPS-PUSCH transmission in a subframe in which UCI is transmitted, an MS piggybacks UCI on the PUSCH of a primary cell and transmits the UCI. That is, the priority of a serving cell (UL CC) on which UCI is piggybacked and transmitted is order of a serving cell in which an SPS-PUSCH is transmitted and a primary cell (UL PCC).

When a situation in which an MS does not receive an uplink grant for a PUSCH dynamically scheduled in a subframe on which an SPS-PUSCH is transmitted is taken into consideration, the method of preferentially piggybacking and transmitting UCI on an SPS-PUSCH is advantageous in error handling.

Figure 13:
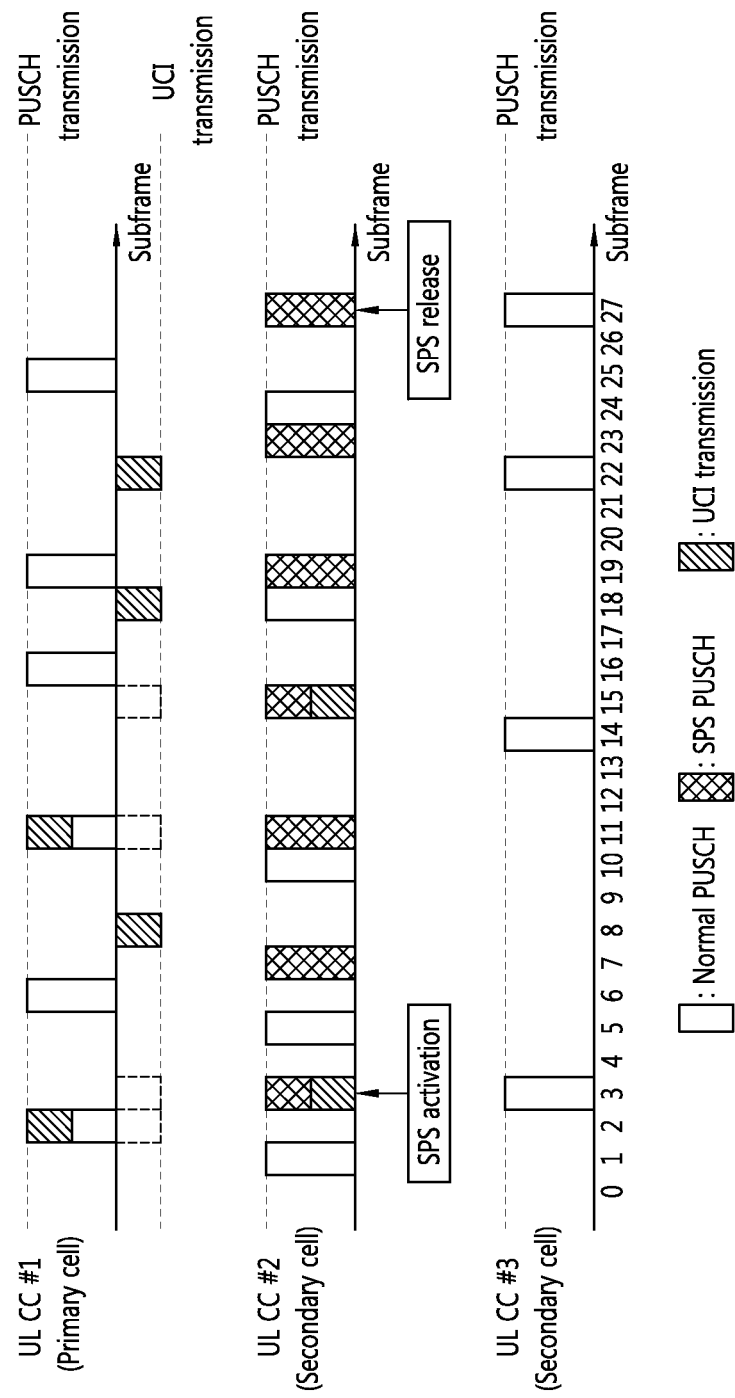
FIG. 13 shows a second example in which UCI is piggybacked.

FIG. 13 shows a second example in which UCI is piggybacked.

Referring to FIG. 13, an MS first piggybacks and transmits UCI through the PUSCH of a primary cell if the PUSCH is transmitted in the primary cell. If the PUSCH of the primary cell is not transmitted in a subframe on which the UCI has to be transmitted, the UCI may be piggybacked on the SPS-PUSCH of a serving cell in which the SPS-PUSCH is transmitted and then transmitted. That is, the priority of a serving cell (UL CC) on which the UCI is piggybacked and transmitted is order of a primary cell (UL PCC) and a serving cell in which the SPS-PUSCH is transmitted. For example, in a subframe 11, UCI is piggybacked and transmitted on the PUSCH of a primary cell. Furthermore, in a subframe 15, since a PUSCH is not transmitted in the primary cell (UL PCC), UCI is piggybacked and transmitted on an SPS-PUSCH transmitted in an UL CC #2.

FIG. 13 shows an example in which the SPS-PUSCH is transmitted in the UL CC #2, that is, a secondary cell, but the second example is not limited thereto. That is, in general, if two or more serving cells are configured for an MS and the simultaneous transmission of a PUSCH and a PUCCH is not configured, an MS may operate as follows.

1. If any PUSCH is not transmitted in a subframe n and UCI consists only periodic Channel Status Information (CSI), the MS transmits the UCI through the PUCCH of a UL PCC.

2. If UCI consists periodic CSI and/or HARQ-ACK and transmission on the subframe n of a primary cell PUSCH is not a random access response grant or the retransmission (in this case, the UCI is not transmitted) of the same transport block as part of a contention-based random access procedure, the MS transmits the UCI through the PUSCH of a primary cell. That is, the MS may piggyback and transmit the UCI through the PUSCH of the primary cell.

3. If UCI consists periodic CSI and/or HARQ-ACK and if the PUSCH of a primary cell is not transmitted and the PUSCH of at least one secondary cell is transmitted in a subframe n, the MS transmits the UCI on the PUSCH of a secondary cell having the smallest cell index (carrier index), from among secondary cells. In other words, if the PUSCH of a primary cell is not transmitted in a subframe in which the MS tries to transmit the UCI and the PUSCH is transmitted in at least one of secondary cells, the MS may piggyback transmit the UCI on the PUSCH of a secondary cell having the smallest cell index, from among the secondary cells. The example of FIG. 13 may be understood as a case where an SPS-PUSCH is transmitted in this common situation, in particular, a secondary cell.

Figure 14:
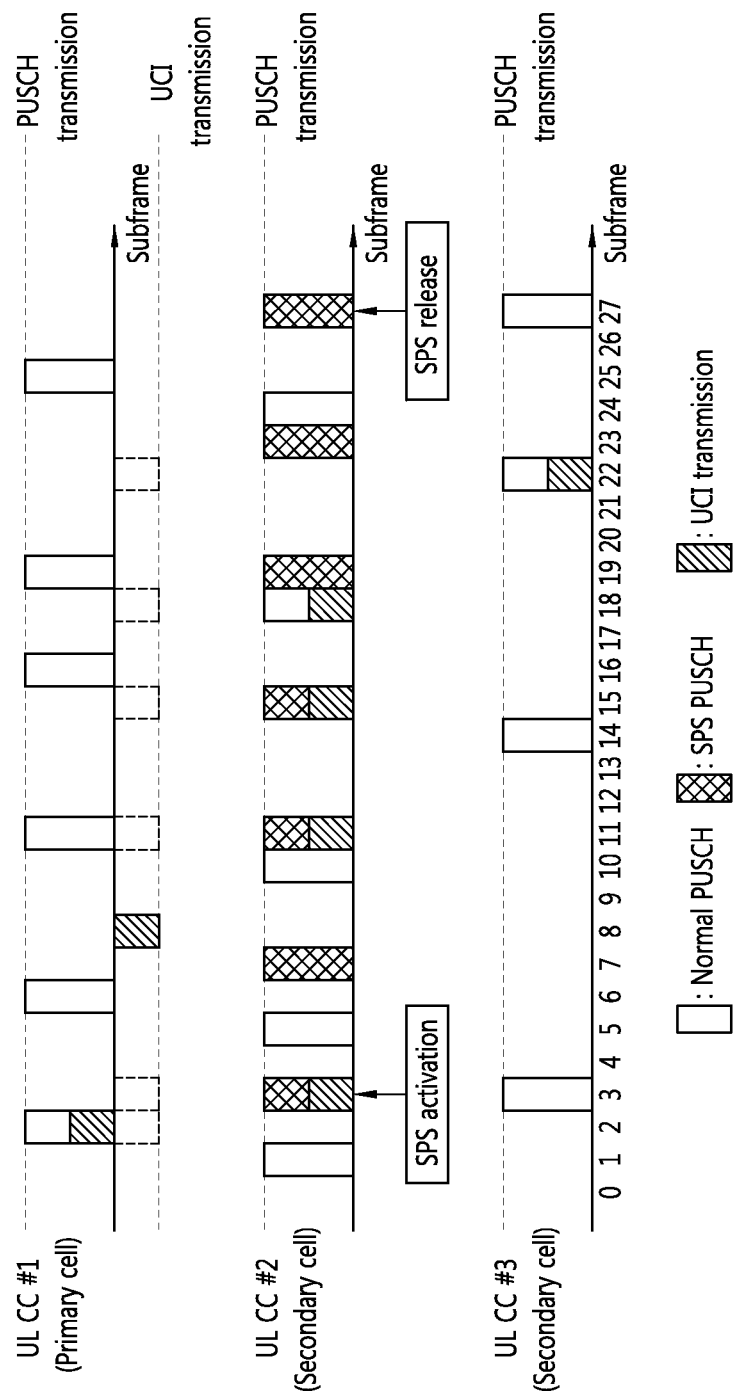
FIG. 14 shows a third example in which UCI is piggybacked.

FIG. 14 shows a third example in which UCI is piggybacked.

Referring to FIG. 14, an MS preferentially piggybacks and transmits UCI on the SPS-PUSCH of a serving cell in which the SPS-PUSCH is transmitted in a subframe in which the SPS-PUSCH is transmitted. For example, if UCI has to be transmitted in subframes 3, 11, and 15, an MS piggybacks and transmits the UCI on the SPS-PUSCH of a UL CC #2 in which the SPS-PUSCH is transmitted. If, in a subframe in which UCI is transmitted, there is no SPS-PUSCH transmission in a primary cell and all secondary cells, an MS piggybacks and transmits the UCI through the PUSCH of the primary cell or the PUSCH of a secondary cell in which the SPS-PUSCH is not transmitted. That is, the priority of a serving cell (UL CC) on which the UCI is piggybacked and transmitted is order of 1. a serving cell in which the SPS-PUSCH is transmitted, 2. a primary cell (UL PCC), 3. the remaining secondary cells or 1. a serving cell in which the SPS-PUSCH is transmitted, 2. the remaining secondary cells, 3. a primary cell (UL PCC).

In the first to third examples described above, all types of pieces of UCI can be piggybacked and transmitted on an SPS-PUSCH, but only a specific type of UCI can be piggybacked and transmitted on an SPS-PUSCH. For example, periodic CQI may always be piggybacked and transmitted on an SPS-PUSCH. In this case, if an MS reduces PUSCH power due to a power limit, there is an advantage in terms of the reception rate of a BS because an SPS-PUSCH including UCI has high protection priority. Or, UCI may be piggybacked by placing a threshold including a combination of a bandwidth and an MCS.

If a single serving cell is configured for an MS and the simultaneous transmission of a PUSCH and a PUCCH is not set, the MS transmits UCI on the PUCCH using the PUCCH formats 1/1a/1b, 2/2a/2b when the PUSCH is not transmitted in a subframe n. If a PUSCH is transmitted in a subframe n and the transmission of the PUSCH is not a random access response grant as part of a contention-based random access procedure or the retransmission of the same transport block, the MS transmits the UCI on the PUSCH.

If a single serving cell is configured for an MS and the simultaneous transmission of a PUSCH and a PUCCH is set, an MS transmits an HARQ-ACK/SR using the PUCCH formats 1/1a/1b and transmits CSI using the PUCCH formats 2/2a/2b. Or, HARQ-ACK and periodic CSI (together with HARQ-ACK) are transmitted on the PUCCH and periodic CSI is transmitted on the PUSCH, using the PUCCH formats 1/1a/1b.

If two or more serving cells are configured for an MS and the simultaneous transmission of a PUSCH and a PUCCH is set, an MS may operate as follows.

1. If UCI includes only an HARQ-ACK/SR, the MS transmits the UCI on the PUCCH using the PUCCH formats 1/1a/1b.

2. If UCI is CSI and is periodic, the MS transmits the UCI on the PUCCH using the PUCCH formats 2/2a/2b.

3. If UCI includes HARQ-ACK and periodic CSI and transmission on the subframe n of a primary cell PUSCH is not a random access response grant or the retransmission (in this case, the periodic CSI is not transmitted) of the same transport block as part of a contention-based random access procedure, the MS transmits the HARQ-ACK on the PUCCH using the PUCCH formats 1/1a/1b/3 and transmits the periodic CSI through the PUSCH of a primary cell.

4. If UCI includes HARQ-ACK and periodic CSI and a PUSCH is not transmitted in a primary cell, but a PUSCH is transmitted in at least one secondary cell in a subframe n, the MS transmits the HARQ-ACK on the PUCCH using the PUCCH formats 1/1a/1b/3 and transmits the periodic CSI on the PUSCH. Here, the PUSCH is the PUSCH of a secondary cell having the smallest carrier index, from among secondary cells.

Figure 15:
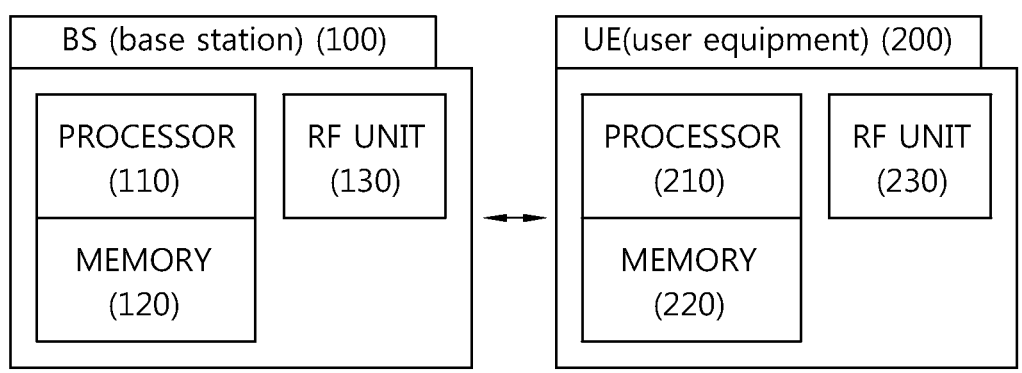
FIG. 15 is a block diagram illustrating a BS and an MS in which an embodiment of the present invention is embodied.

FIG. 15 is a block diagram illustrating a BS and UE in which the embodiments of the present invention are embodied.

The BS 100 includes a processor 110, memory 120, and a Radio Frequency (RF) unit 130. The processor 110 embodies the proposed functions, processes and/or methods. The layers of a wireless interface protocol can be embodied by the processor 110. The processor 110 can send an uplink grant to UE and receive UCI from UE. The memory 120 is connected to the processor 110, and it stores various pieces of information for driving the processor 110. The RF unit 130 is connected to the processor 110, and it transmits and/or receives radio signals.

The UE 200 includes a processor 210, memory 220, and an RF unit 230. The processor 210 embodies the proposed functions, processes and/or methods. The layers of a wireless interface protocol can be embodied by the processor 210. The processor 210 transmits uplink control information through the PUSCH of a primary cell in a subframe in which there is the PUSCH transmission of a primary cell. If there is the PUSCH transmission of one or more secondary cells in a subframe in which there is no the PUSCH transmission of a primary cell, the processor 210 piggybacks and transmits uplink control information through the PUSCH of any one of the one or more secondary cells. Here, the any one secondary cell may be a secondary cell having the smallest cell index (carrier index). The memory 220 is connected to the processor 210, and it stores various pieces of information for driving the processor 210. The RF unit 230 is connected to the processor 210, and it transmits/receives radio signals and transmits spread complex modulation symbols to a BS.

The processor 110, 210 may include Application-Specific Integrated Circuits (ASICs), other chipsets, logic circuits, or data processors or all of them. The memory 120, 220 may include Read-Only Memory (ROM), Random Access Memory (RAM), flash memory, memory cards, storage media and/or other storage devices. The RF unit 130, 230 may include a baseband circuit for processing radio signals. When the above-described embodiment is embodied in software, the above-described scheme may be embodied using a module (process or function) that performs the above function. The module may be stored in the memory 120, 220 and executed by the processor 110, 210. The memory 120, 220 may be placed inside or outside the processor 110, 210 and connected to the processor 110, 210 using a variety of well-known means. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

The invention claimed is:

1. An uplink control information Uplink (UCI) transmission method performed by a mobile station (MS) in a carrier aggregation system, the method comprising:
   generating, by the MS, UCI; and
   transmitting, by the MS, the UCI in a subframe,
   wherein:
      if the MS is configured with a primary cell and at least one secondary cell and if the MS is not configured for simultaneous transmission of a physical uplink shared channel (PUSCH) that is a data channel and a physical uplink control channel (PUCCH) that is a control channel,
      the MS transmits the UCI through a PUSCH of the primary cell in the subframe if there is PUSCH transmission on the primary cell in the subframe, and
      the MS transmits the UCI through a PUSCH of one specific secondary cell among the at least one secondary cell if there is no PUSCH transmission on the primary cell in the subframe and if there is PUSCH transmission on the at least one secondary cell in the subframe,
   wherein priorities for transmitting the UCI are in order of the primary cell and the at least one secondary cell in which the PUSCH is transmitted, and
   wherein the one specific secondary cell is a secondary cell having a smallest cell index among the at least one secondary cell.

2. The method of claim 1, wherein a PUSCH of the secondary cell having the smallest carrier index is a PUSCH of a subframe that is semi-persistently scheduled.

3. The method of claim 1, wherein the UCI is transmitted through a PUCCH of the primary cell in a subframe in which a PUSCH is not transmitted in both the primary cell and the at least one secondary cell.

4. The method of claim 1, wherein the UCI comprises at least one of periodic channel state information and Hybrid Automatic Repeat Request (HARQ) acknowledgement (ACK).

5. The method of claim 1, further comprising:
   receiving an uplink grant from a base station,
   wherein the uplink grant comprises information on the allocation of resources and information on modulation coding for the at least one secondary cell, and
   the mobile station determines a secondary cell in which the UCI will be transmitted based on the information on the allocation of resources or the information on modulation coding.

6. The method of claim 5, wherein the information on the allocation of resources comprises information on a transmission bandwidth for each of the at least one secondary cell.

7. The method of claim 6, wherein the MS transmits the UCI through a secondary cell whose bandwidth indicated by the information on the transmission bandwidth is greater than a predetermined threshold.

8. The method of claim 1, wherein the primary cell is a serving cell in which the mobile station performs an initial connection establishment procedure or a connection re-establishment procedure with a base station.

9. A mobile station (MS), comprising:
- a radio frequency (RF) unit configured to transmit and receive radio signals; and
- a processor connected to the RF unit and configured to:
  generate uplink control information (UCI); and
  transmit the UCI in a subframe,
  wherein:
    if the MS is configured with a primary cell and at least one secondary cell and if the MS is not configured for simultaneous transmission of a physical uplink shared channel (PUSCH) that is a data channel and a physical uplink control channel (PUCCH) that is a control channel,
      the MS transmits the UCI through a PUSCH of the primary cell in the subframe if there is PUSCH transmission on the primary cell in the subframe, and
      the MS transmits the UCI through a PUSCH of one specific secondary cell among the at least one secondary cell if there is no PUSCH transmission on the primary cell in the subframe and if there is PUSCH transmission on the at least one secondary cell in the subframe,
    wherein priorities for transmitting the UCI are in order of the primary cell and the at least one secondary cell in which the PUSCH is transmitted, and
    wherein the one specific secondary cell is a secondary cell having a smallest cell index among the at least one secondary cell.

10. The MS of claim 9, wherein a PUSCH of the secondary cell having the smallest carrier index is a PUSCH of a subframe that is semi-persistently scheduled.

11. The MS of claim 9, wherein the UCI is transmitted through a PUCCH of the primary cell in a subframe in which a PUSCH is not transmitted in both the primary cell and the at least one secondary cell.

* * * * *